G. W. HEALD.
Oscillating Engines.

No. 158,938.  Patented Jan. 19, 1875.

WITNESSES:
E. Wolff
A. F. Terry

INVENTOR:
Geo. Webster Heald
BY
ATTORNEYS.

UNITED STATES PATENT OFFICE.

GEORGE W. HEALD, OF BALDWINSVILLE, N. Y., ASSIGNOR TO HIMSELF AND WILLIAM F. MORRIS, OF SAME PLACE.

IMPROVEMENT IN OSCILLATING ENGINES.

Specification forming part of Letters Patent No. 158,938, dated January 19, 1875; application filed December 5, 1874.

*To all whom it may concern:*

Be it known that I, GEORGE W. HEALD, of Baldwinsville, Onondaga county, New York, have invented new and useful Improvements in Oscillating Engines, of which the following is a specification:

My improvement in oscillating engines consists of a novel contrivance of tightening bearings and adjusting-screws therefor with the cross-head of the piston-rod, which is arranged in guides projecting from the cylinder-head, to take the strain of oscillating the cylinder from the rod.

Figure 1:
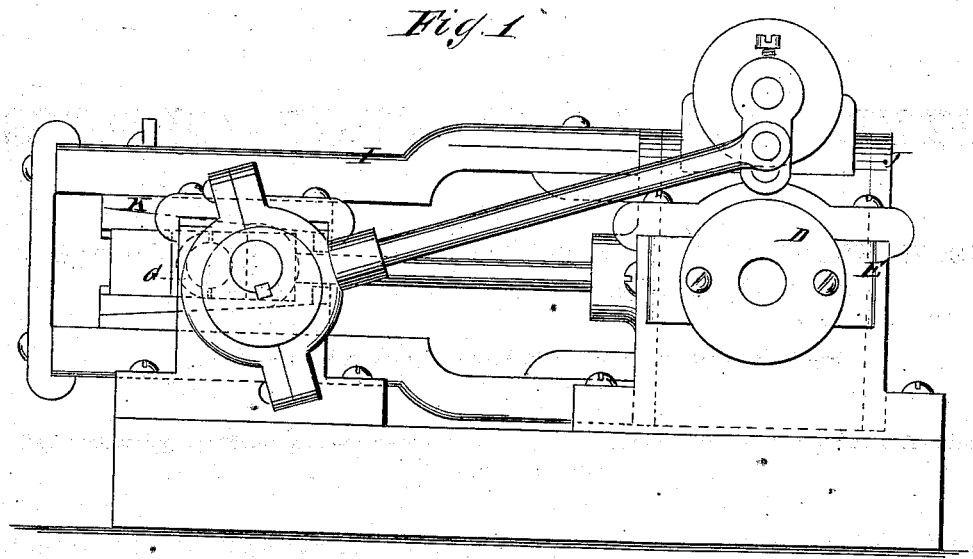
Figure 2:
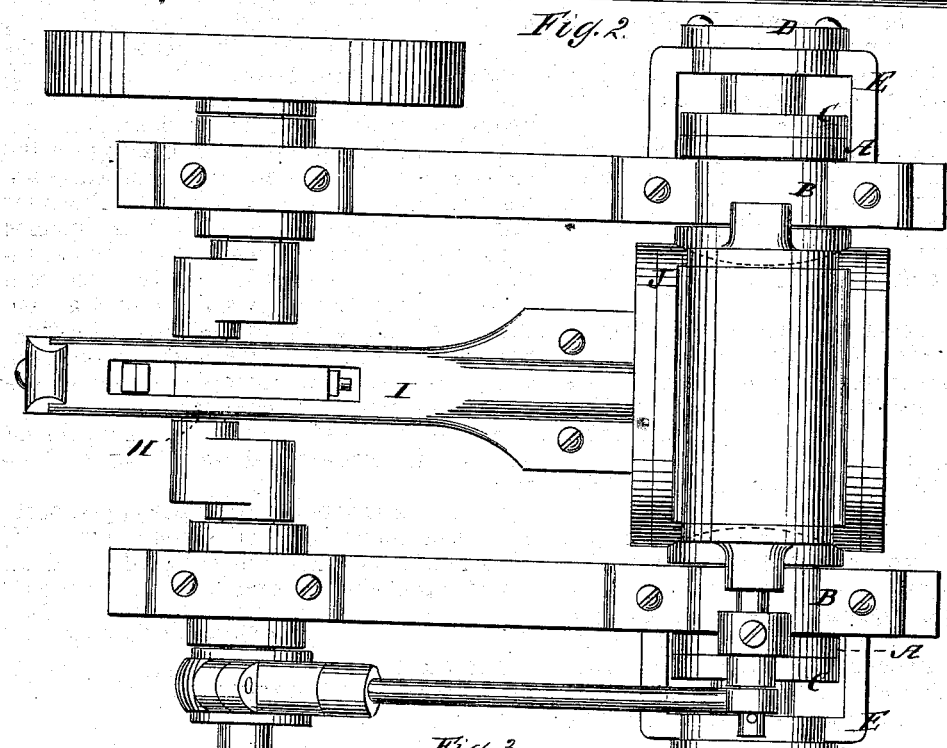
Figure 3:
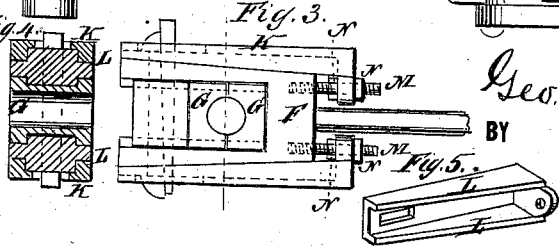

Figure 1 is a side elevation of my improved engine. Fig. 2 is a plan view. Fig. 3 is a side elevation of the cross-head and adjusting keys and screws. Fig. 4 is a cross-section of Fig. 3 on the line $x\,x$, and Fig. 5 is a perspective view of an adjusting-key.

Similar letters of reference indicate corresponding parts.

A represents the main trunnions; B, the main trunnion-bearings; C, the stuffing-boxes; D, the stationary tubular trunnions; and E the yoke-shaped bearings therefor projecting from the main bearings. The inlet and outlet pipes will be attached to these stationary trunnions, which thus form substantial and simple connections for the pipes with the oscillating trunnions. They are bolted to the bearings E, to prevent being turned by the oscillating trunnions. F represents the cross-head of the piston, carrying the boxes G for the crank H, and working in the guides I, to relieve the piston-rod of the strain of oscillating the cylinder J, and K represents the bearings of the cross-head in the guides. These bearings are also contrived to serve as tightening-keys for taking up the slack by means of the inclines L on them, and the corresponding reverse inclines on the cross-heads, and they are connected to the stud-screws M projecting from the cross-head, and provided with adjusting-nuts N, by which they are forced in and out, as may be required; but other means of adjusting them may be employed.

Having thus described my invention, I claim as new and desire to secure by Letters Patent—

The combination of the wedge-shaped bearings, stud-screws M, and adjusting-nuts N, with the cross-head F and the guides I of an oscillating engine, substantially as specified.

GEORGE W. HEALD.

Witnesses:
FRED. A. MARVIN,
G. A. BIGELOW.